DECODER FOR PULSE CODE MODULATION SYSTEMS OF COMMUNICATION

Filed Aug. 18, 1964 4 Sheets-Sheet 1

Inventor
ALEC H. REEVES, KENNETH W. CATTERMOLE & RYSZARD KITAJEWSKI
By Percy P. Lantzy
Attorney Inventor
ALEC H. REEVES, KENNETH W. CATTERMOLE & RYSZARD KITASEWSKI
By Percy P. Lantzy
Attorney

DECODER FOR PULSE CODE MODULATION SYSTEMS OF COMMUNICATION

Filed Aug. 18, 1964 4 Sheets-Sheet 3

Inventor
ALEC H. REEVES, KENNETH
W. CATTERMOLE & RYSZARD KITAJEWSKI
By Percy P. Lantzy
Attorney

DECODER FOR PULSE CODE MODULATION SYSTEMS OF COMMUNICATION

Filed Aug. 18, 1964 4 Sheets-Sheet 4

Inventor
ALEC H. REEVES, KENNETH
W. CATTERMOLE & RYSZARD KITAJEWSKI
By Percy P. Lantzy
Attorney 3,399,403
DECODER FOR PULSE CODE MODULATION SYSTEMS OF COMMUNICATION Alec Harley Reeves, Kenneth William Cattermole, and Ryszard Kitajewski, London, England, assignors to International Standard Electric Corporation, New York, N.Y., a corporation of Delaware
Filed Aug. 18, 1964, Ser. No. 390,293
Claims priority, application Great Britain, Sept. 25, 1963, 37,714/63
14 Claims. (Cl. 340—347)

ABSTRACT OF THE DISCLOSURE

A first tuned circuit is activated prior to the arrival of a code combination to generate a wave of fixed initial amplitude and decaying at a predetermined constant amplitude ratio. This wave is sampled by digit pulses of the code combination. The resultant samples are summed and stored in a second tuned circuit to provide the decoder output. Where the code combination includes a first portion indicating one of a plurality of groups of code levels containing the coded level and a second portion indicating the coded level position in the indicated group, a given amplitude is added to the samples in the second tuned circuit, derived from the second portion, which is then damped to provide the predetermined amplitude ratio between adjacent time slots. The first portion selects the damped stored amplitude in the appropriate time slot to provide the decoder output.

This invention relates to a decoder for a pulse code modulation system of communication.

The invention provides a decoder for a pulse code modulation system of communication, in which samples of signal waves to be conveyed over the system are represented by code combinations of digit pulses according to a binary code, the digits being transmitted in order of significance with the digit of greatest significance being transmitted first, the decoder including means for generating a wave at a fixed time prior to the arrival of the first code digit, the wave being of fixed initial amplitude and decaying by a predetermined constant amplitude ratio, means for sampling the wave when any digit pulse is received, and means for integrating the results of the amplitude samplings to produce the decoder output.

The invention also provides a decoder for a pulse code modulation system of communication in which samples of signal waves to be conveyed over the system are represented by code combinations of digit pulses wherein a part of the code combination indicates in a simple binary code the group of a number of groups of levels, having a constant amplitude range within which the coded level lies, the remainder of the code combination indicating the position of the level within that group, the decoder including means for generating at a fixed time prior to the arrival of the first-mentioned part of the code combination a wave having a fixed initial amplitude and decaying by a predetermined constant amplitude ratio, means for sampling the wave when any digit pulse in that part of the code combination is received, means for storing and integrating the results of the samplings, means for generating a second wave of initial amplitude proportional to the stored and integrated samplings of the first wave, the second wave decaying at a rate or rates and for a length or lengths of time depending on the values of the code digits of the second-mentioned part of the code combination, and means for sampling the second wave at a time when the amplitude thereof will provide an output linearly proportional to the amplitude of the coder input signal.

Figures 1A, 1B, 1C:
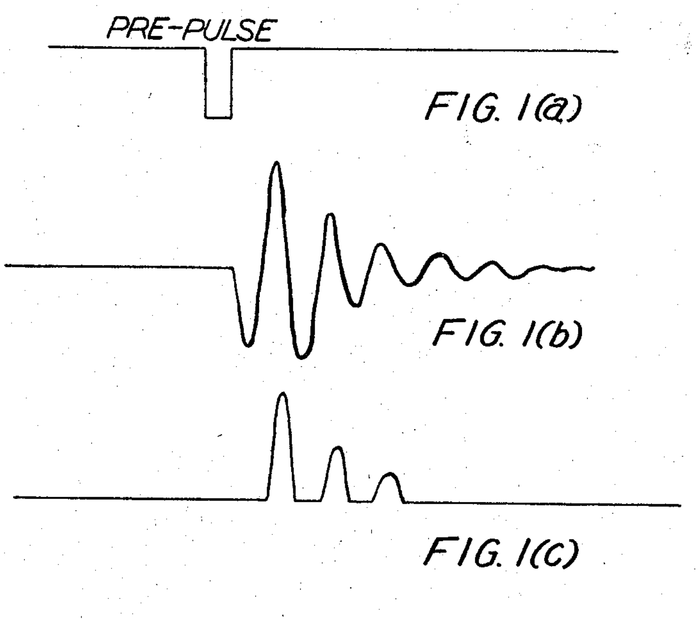
Figure 4:
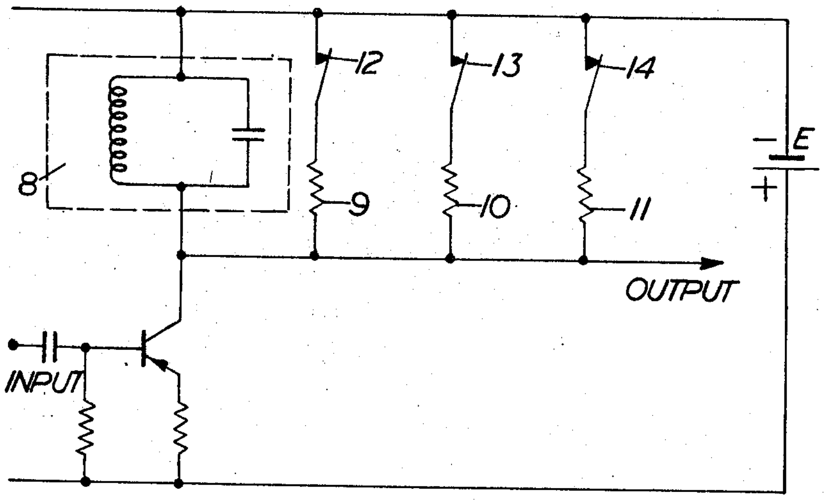
Figure 2:
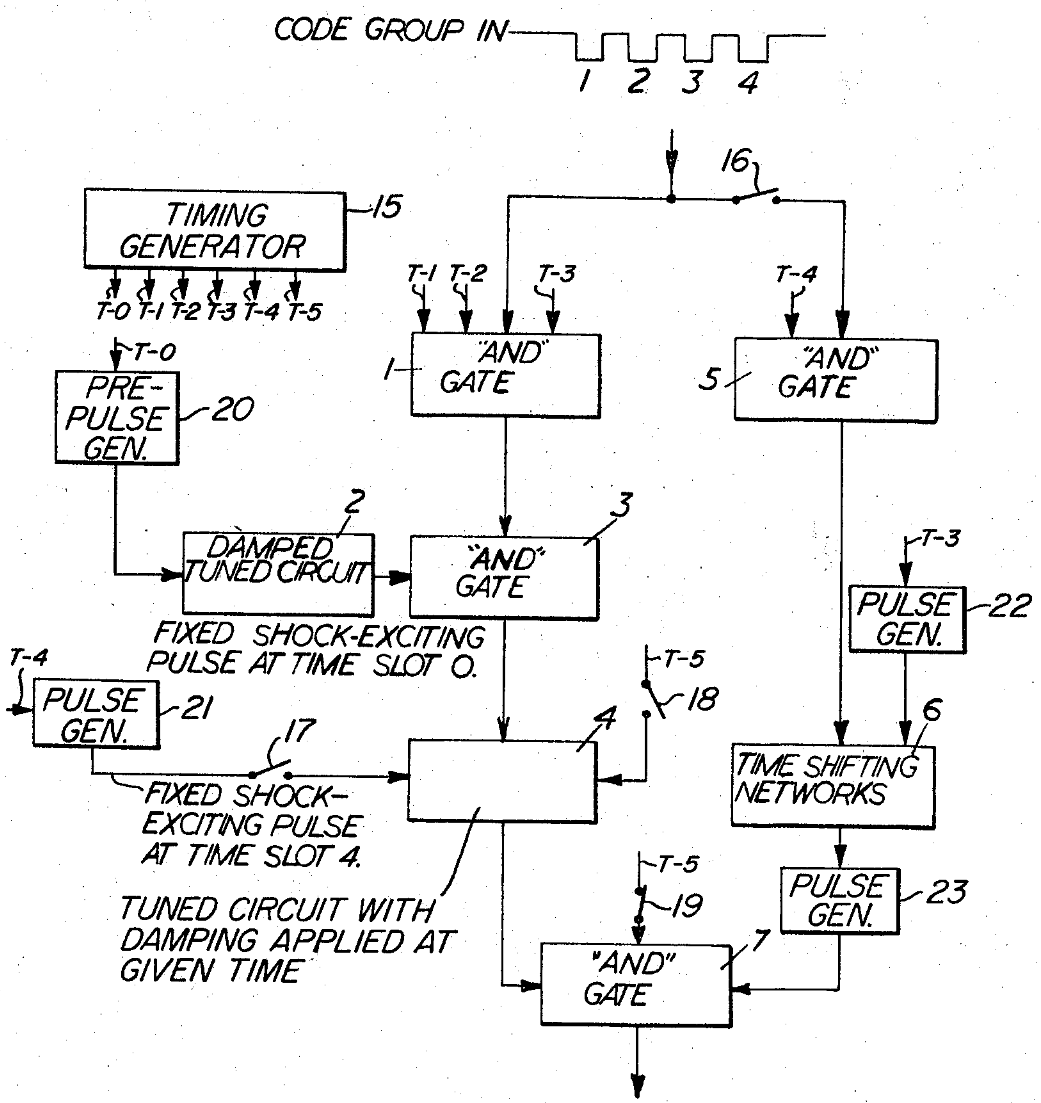
Figure 3F:
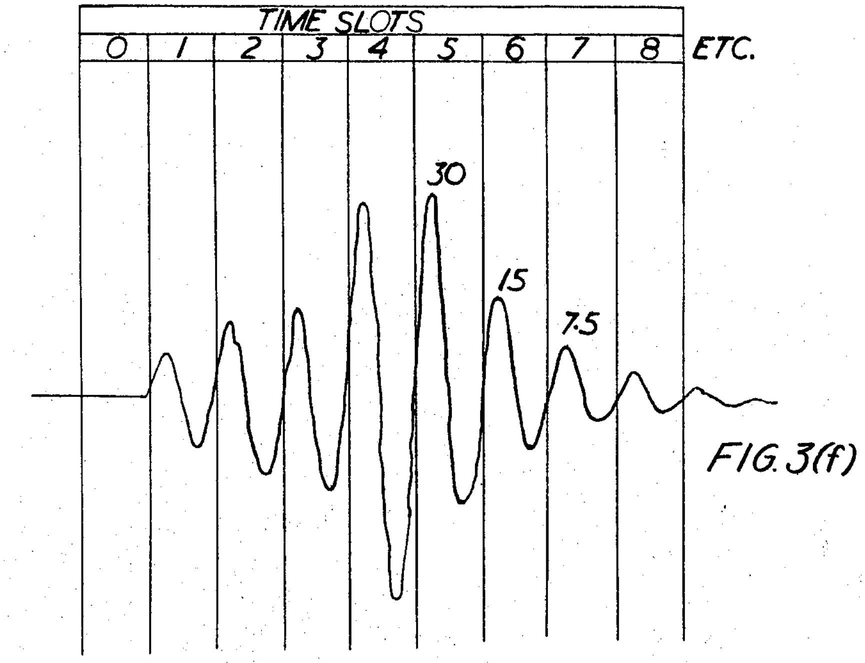
Figure 3G:
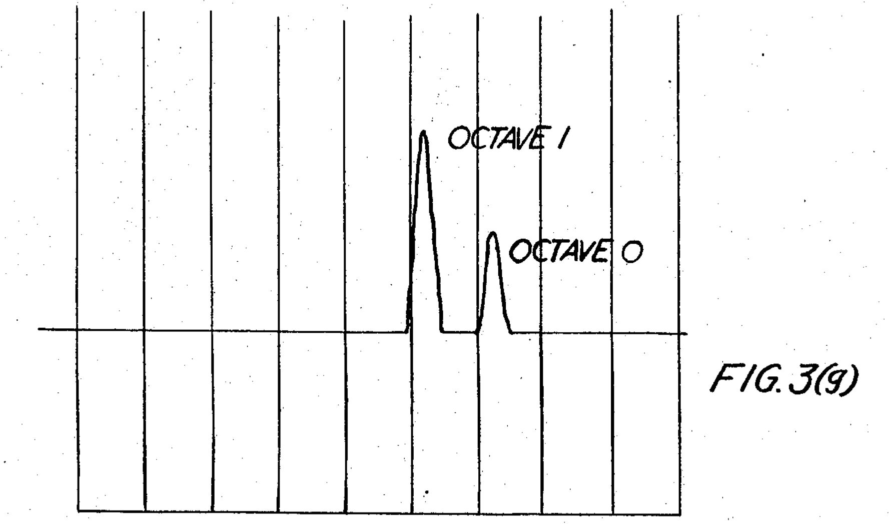
Figures 3A, 3B, 3C, 3D, 3E:
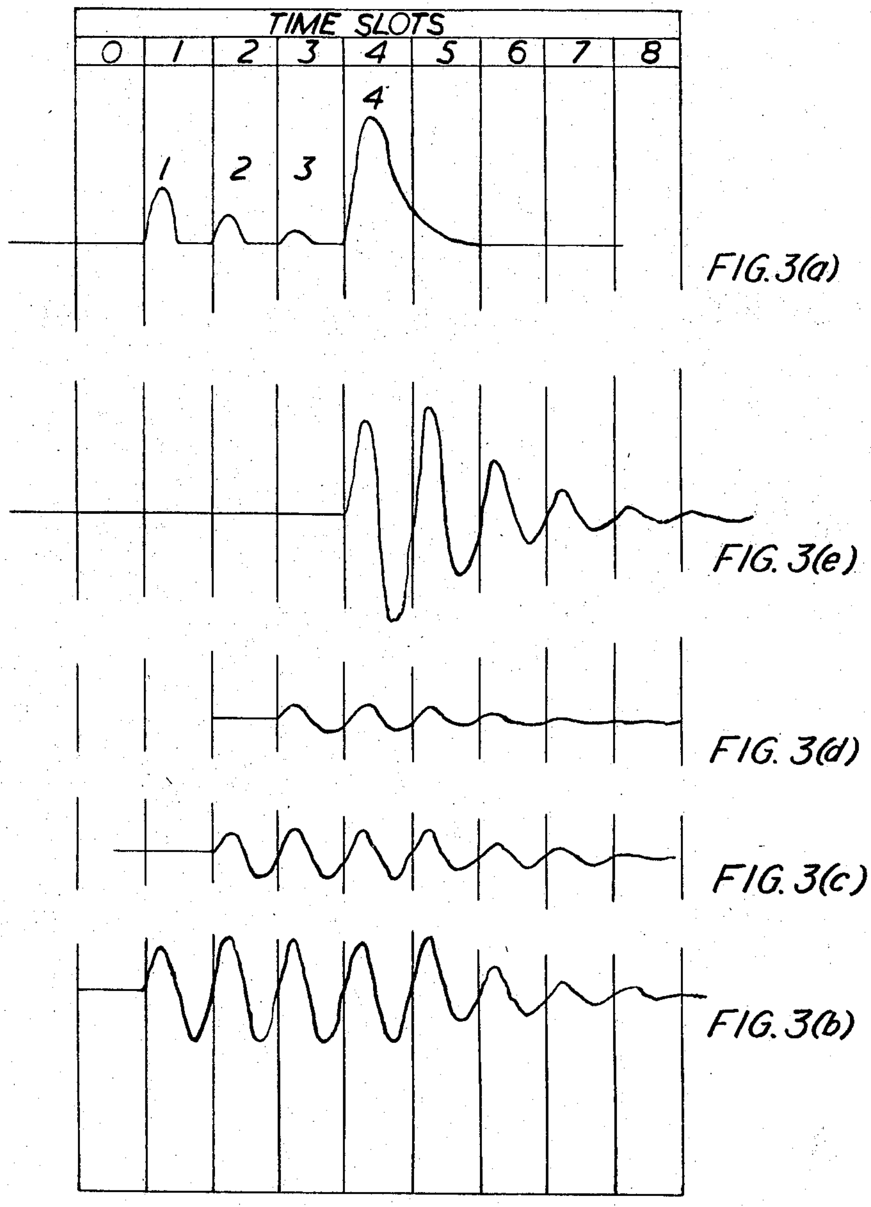

In order that the invention may be more clearly understood, embodiments thereof are now described with reference to the accompanying drawings in which:

FIGS. 1(*a*) to 1(*c*) illustrate waveforms useful in explaining the operation of the decoder of FIG. 2;

FIG. 2 is a block diagram of a decoder in accordance with the principles of the present invention;

FIGS. 3(*a*) to 3(*g*) illustrate certain waveforms useful in explaining the operation of the decoder of FIG. 2; and FIG. 4 is a schematic diagram of a circuit by which the damping on a tuned circuit may be varied.

Any network exhibiting the characteristics of exponential or varying decay, such as the discharging curve of a capacitor or a damped tuned circuit, can be used to enable an incoming code group to be decoded to produce an output of descending amplitudes in the ratio of 2:1 for every one code element time interval. In the prior art the code pulses have been utilized to produce the damped wave, which is sampled at equal time intervals, at periods $p$, $2p$, etc., in the case of a shock-excited tuned circuit. The sampled values are then stored and added, which results in the first code digit having the smallest effect of the group if the damping is positive. It is, however, usually more convenient, in particular from the coding aspect, for the first code pulse to represent the largest and not the smallest digit. One method of overcoming this difficulty in the past has been the use of negative, not positive damping on the tuned circuit. Difficulties arise, however, in keeping the damping sufficiently constant throughout the large amplitude range required, and these difficulties are increased still further by the need for this damping to be relatively high. When it is considered that there is a voltage ratio of 2:1 at each vibrational period it will be seen that this is an unusual operating condition for the build-up of an oscillation.

In the present invention the decaying wave starts always from a fixed, predetermined amplitude, using positive damping, and the wave is sampled by the incoming code pulses.

The wave is made to decay in a predetermined manner, either at a constant logarithmic rate for a linear decoder, or at a varying rate if the output is to be expanded to compensate for an equal and opposite degree of compressing at the coder. Preferably the damped wave is periodic rather than aperiodic. In particular, the resulting smaller bandwidth is less susceptible to noise, and allows looser tolerances for the sampling times.

*A simple linear decoder*

Referring to FIG. 2, a linear decoder according to the principles of the present invention is provided by opening switches 16, 17 and 18 and closing switch 19. For purposes of explanation, it will be assumed that the code group only includes three digits each of which are pulses, or in the binary condition "1." At a fixed time prior to the reception of the code group timing generator 15 produces a timing time coincident with time slot 0 to trigger pre-pulse generator 20 to produce the pre-pulse as illustrate in FIG. 1(*a*). The back-edge of the pre-pulse shock-excites damped tuned circuit 2 to produce a train of oscillations having a frequency equal to the "bit or digit rate" of the incoming digits. Circuit 2 is damped by a suitable impedance to positive peak outputs of descending amplitude in the ratio of 2:1 as illustrated in FIG. 1(*b*). This output is now sampled by the incoming code group, as a result of which an output is obtained for each digit proportional to its assigned weighted value. Thus, with each digit of the three digit code combination a pulse (binary condition "1") the sampled waveform is as illustrated in FIG. 1(*c*).

The sampling process is carried out in the following manner by the components of FIG. 2. The input code group is coupled to AND gate 1 which is sequentially gated by timing signals T–1, T–2, and T–3 each of which are time coincident with the respective time slots 1, 2 and 3 to detect the binary condition of all the diigts of the assumed three-digit code combination. AND gate 1 will produce a pulse output each time a digit is a pulse, or, in other words, in binary condition "1." These pulse outputs gate AND gate 3 to thereby sample the output of tuned circuit 2.

The information obtained from the sampling is summed and stored in a suitable network, such as a capacitor or a tuned circuit, for instance, tuned circuit 4. A pulse output from AND gate 3, indicating the presence of a digit pulse, shock excites tuned circuit 4. Where pulses are present for each digit of the three-digit code combination, the waveforms in tuned circuit 4 due to the sampling are illustrated in FIG. 3(*b*), 3(*c*) and 3(*d*) for the time slots 1, 2 and 3. These three waveforms are summed to produce at the output of tuned circuit 4 a waveform as illustrated in FIG. 3(*f*) in time slots 1, 2 and 3. This summed output is coupled to AND gate 7 which is gated by timing signal T–4 from timing generator 15 to read out the stored amplitude and thereby produce the decoder output. Timing signal T–4 is time coincident with timing slot 4 and the stored information in this time slot will be the same as that present in time slot 3.

*A digitally expanding decoder*

The decoder described below is utilized in a system where the maximum amplitude to be coded is divided into eight octaves, each of which encompasses eight levels, the quantum step between successive octaves except octave 0 being doubled at each step. Such a code is illustrated in the following table.

| Octave No.: | Level range |
|---|---|
| 0 | 0–7 |
| 1 | 8–15 |
| 2 | 16–30 |
| 3 | 32–60 |
| 4 | 64–120 |
| 5 | 128–240 |
| 6 | 256–480 |
| 7 | 512–960 |

Thus, the digital information required to convey any one of the levels within the level range 0 to 960 can be coded in the form of a 6-digit code, which is in fact two groups of three digits. The first three digits represent one of the eight levels within an octave and the remaining three digits represent the particular one of the eight octaves within which the level is situated. For example, level 40 is conveyed in the six digit code group 010011. The first three digits 010 signify that level 40 is the third level in an octave and the second three digits 011 signify that the octave concerned is octave No. 3 (the fourth octave).

A simplified version of a digital expanding decoder for four digits only is shown in the block diagram of FIG. 2 with switches 16, 17 and 18 closed and switch 19 opened. In this case he first three digits represent the level position within the octave and the fourth digit represents one of two octaves. The incoming code group is applied to "AND" gate 1 which selects the first three digits representing the level position within the octave by means of timing signals T–1, T–2, and T–3 from generator 15. The fourth digit, if present, is rejected.

The damped tuned circuit 2 is shock-excited by the pre-pulse in the manner previously described. This tuned circuit produces a positive peak output per period of descending amplitude in the ratio of 2:1, and this output is sampled by the output from gate 1 by AND gate 3. It is assumed that all three digits are present and that the sampled waveform appearing at the output of gate 3 will be similar to that shown in FIG. 1(*c*). The three pulses appearing at the output of gate 3 will be considered as appearing in time slots 1, 2 and 3 shown in FIG. 3(*a*). These pulses are utilized to shock-excite a second tuned circuit 4. The waveforms generated by this tuned circuit 4, caused by each pulse separately, are shown in FIGS. 3(*b*), (*c*) and (*d*). The tuned circuit 4 is also shock-excited in time slot 4 by a pulse from generator 21 activated by timing signal T–4 from generator 15 so as to produce a waveform of constant amplitude, FIG. 3(*e*), corresponding to level 8, which is the equivalent of the lowest level in octave No. 1.

The tuned circuit 4 is also damped, decaying by the ratio 2:1 in amplitude at each period, similar to the first damped tuned circuit 2, but the damping is not applied until the beginning of time slot 5 under control of the timing signal T–5 from generator 15. Thus, adding the waveforms FIGS. 3(*b*), (*c*), (*d*) and (*e*) algebraically produces initially the waveform of FIG. 3(*f*) as shown in time slots 1 to 4. As a result of the damping being switched on in time slot 5 the amplitude of the waveform of FIG. 3(*f*) in time slot 5 is twice that of the amplitude in time slot 6, thus giving an output for octave 0 in time slot 6 and for octave 1 in time slot 5.

To select the appropriate octave in accordance with the received information it is necessary to sample the output in time slot 5, when digit 4 is present indicating octave 1. However, when this digit is absent (indicating octave 0) the sampling should take place in time slot 6. This is achieved in the following manner. The AND gate 5 in FIG. 2 opens in time slot 4 under control of timing signal T–4 from generator 15, selecting the fourth digit if present. The presence of this digit is made to delay, by means of the time shifting networks 6, the back edge of a pulse generated by pulse generator 22 activated by a timing signal from generator 15 prior to timing signal T–4, such as timing signal T–3. The resulting time-modulated back-edge of the pulse is used to trigger another pulse generator 22 to produce a gate pulse that opens sampling AND gate 7. The timing of the sampling pulse from generator 22 is such that when digit 4 is present time slot 5 will be selected by AND gate 7, whereas if digit 4 is absent time slot 6 will be selected. For example, this can be accomplished by having network 6 include two sections, one of which may be bypassed under control of an output from gate 5. Thus, when digit 4 is present, network 6 has one section bypassed to delay the back-edge of the pulse from generator 22 to be time coincident with the start of time slot 5 to trigger generator 23 to produce a gate pulse in time slot 5. When digit 4 is absent, both sections of network 6 are present to delay the back-edge of the pulse from generator 22 to be time coincident with the start of time slot 6 so that generator 23 is triggered to produce a gate pulse in time slot 6. The results of the sampling will be to select either one of the two peaks shown in the waveform of FIG. 3(*g*).

Therefore, the output of the decoder shown in FIG. 2 is a pulse amplitude modulated output, the amplitude of the pulse representing the amplitude of the originally encoded signal sample.

In the case of a code involving eight octaves, i.e., digits 4, 5 and 6 of a 6-digit code all being used to denote the octave number, the principles described above can be extended. In this case digits 4, 5 and 6 are first decoded to produce a pulse amplitude modulated output, and this output is then used to modulate the back edge of the pulse generator which controls the sampling gate. The shift in the back edge is made proportional to the amplitude of the decoded P.A.M. waveform. The decoding of the digits 4, 5 and 6 can be performed separately by an arrangement of a tuned circuit and gates as already described in connection with digits 1, 2 and 3, or the decoding of digits 4, 5 and 6 can be performed by the same tuned circuit and gates as digits 1, 2 and 3 if a delay of one time slot is inserted between digits 3 and 4. This delay is necessary to allow the tuned circuit to be freed between decoding the first three digits and the last three digits. In the latter case, the highest octave, i.e., octave No. 7, would then appear in time slot 9, and the lowest octave would appear in time slot 16.

In the last example, the damping was kept constant, and the octave was selected in accordance with the received code. An alternative method for selecting the octave is to carry out the sampling at a fixed time, i.e., time slot 15, and apply the damping anywhere between time slot 7 and time slot 15 depending on which octave is to be selected. Thus, to select octave No. 7 the application of the damping is delayed until time slot 15, whereas to select octave No. 6 the damping is applied in time slot 14.

An alternative method of selecting the required octave is by selecting the amount and duration of the damping and sampling the result in a fixed time slot, i.e., time slot 9. One arrangement for doing this is shown in FIG. 4 in which the tuned circuit 8 is damped by three separate damping impedances 9, 10 and 11. These damping impedances are removed from the tuned circuit 8 by means of the switches 12, 13 and 14. Switch 12 is opened in time slot 5 when digit 4 is present in time slot 4, thus removing the damping impedance 9 from the tuned circuit at the start of time slot 5. Similarly, the presence of digit 5 in time slot 5 removes the damping impedance 10 at the start of time slot 6, and digit 6 removes the damping impedance 11 at the start of time slot 7. Thus, when switch 12 is closed the damping impedance 9 operates throughout three time slots, the damping impedance 10 operates through two time slots when the switch 13 is closed and the damping impedance 11 operates through one time slot when the switch 14 is closed. Since the oscillation on the tuned circuit is decaying exponentially when the damping is present, it is, therefore, evident that if $$\frac{1}{R_1}=\frac{4}{3}\cdot\frac{1}{R_2}=\frac{4}{3}\cdot\frac{1}{R_3}$$

the necessary decoding of the three octave number digits takes place automatically, the amplitude sampled in time slot 9 being proportional to $2(4a+2b+c)$, where $a$, $b$ and $c$ are the values of the last three digits of the 6-digit code group, all these values being either 0 or 1.

In the above examples, all the output levels have been assumed to be on the same side of zero. For a practical expanding code for P.C.M. an extra code digit, usually the first, is sent to indicate whether the coded level is positive or negative. To fit such a transmitted code the digit arriving in the appropriate extra time slot is selected separately and made to operate a reversing switch on the decoded output when, for example, that digit is a 1.

In an electronic decoder, switches 12, 13 and 14 can be simple transistor switches.

What we claim is:

1. A decoder for a code combination of binary digits representing an analog sample of an analog signal, the digits of said combination being received in order of significance with the digits of greatest significance being received first, comprising:

a source of said combination;

first means activated at a fixed time prior to the arrival of said combination to generate a sine wave having a frequency equal to the digit frequency of said combination, a fixed initial amplitude, and an amplitude decay to provide a predetermined constant amplitude ratio between adjacent cycles thereof;

second means coupled to said source and said first means responsive to the occurrence of digits of said combination having a given binary condition to sample said wave; and third means coupled to said second means responsive to the samples of said wave to produce the decoder output.

2. A decoder according to claim 1, wherein said first means includes a damped tuned circuit.

3. A decoder according to claim 1, wherein said second means includes at least one AND gate.

4. A decoder according to claim 1, wherein said second means includes a timing generator producing timing signals time coincident with the digits of said combination, a first AND gate coupled to said source and said timing generator responsive to said timing signals and said given binary condition to produce time sequential output pulses, and a second AND gate coupled to said first means and said first AND gate responsive to said time sequential output pulses to sample said wave

5. A decoder according to claim 1, wherein said third means includes fourth means coupled to said second means to sum said samples of said wave to produce said decoder output.

6. A decoder according to claim 16, wherein said fourth means includes a tuned circuit,

7. A decoder according to claim 1, wherein said third means includes a tuned circuit coupled to said second means to sum and store said samples of said wave, and an AND gate coupled to said tuned circuit activated at a given time after the conclusion of sampling said wave to read out the value stored in said tuned circuit to provide said decoder output.

8. A decoder according to claim 1, further including a timing generator producing a first timing signal at a fixed time prior to the arrival of said combination, a plurality of timing signals each time coincident with a different one of the digits of said combination, and a second timing signal succeeding said plurality of timing signals; and wherein said first means includes a damped tuned circuit coupled to said timing generator shock excited in response to said first timing signal;

said second means includes a first AND gate coupled to said source and said timing generator responsive to said plurality of timing signals and said given binary condition to produce time sequential output pulses, and a second AND gate coupled to said damped tuned circuit and said first AND gate responsive to said time sequential output pulses to sample said wave; and said third means includes a second tuned circuit coupled to said second AND gate to sum and store said samples of said waves, and a third AND gate coupled to said second tuned circuit and said timing generator activated by said second timing signal to read out the value stored in said second tuned circuit to provide said decoder output.

9. A decoder according to claim 1, wherein said combination includes a first portion indicating the group of a plurality of groups of code levels within which the coded level is disposed, and a second portion indicating the position of said coded level within said indicated group;

said second means being responsive to the occurrence of digits of said second portion of said combination having a given binary condition to sample said wave; and said third means includes fourth means to generate a pulse having an amplitude proportional to a given coded level of a given one of said plurality of groups of levels at a fixed time after sampling said wave, fifth means coupled to said second means and said fourth means to sum and store the amplitude of said pulse and said samples of said wave, said stored amplitude being damped at a fixed time after the generation of said pulse to provide a predetermined constant amplitude ratio thereof between adjacent time slots, and sixth means coupled to said source and said fifth means responsive to said first portion of said combination to select said damped stored amplitude in one of said adjacent time slots to produce said decoder output.

10. A decoder according to claim 9, wherein said first means includes a damped tuned circuit.

11. A decoder according to claim 9, wherein said second means includes at least one AND gate.

12. A decoder according to claim 9, wherein said second means includes a timing generator producing a plurality of timing signals each time coincident with a different one of the digits of said second portion of said combination, a first AND gate coupled to said source and said timing generator responsive to said plurality of timing signals and said given binary condition of the digits of said second portion of said combination to produce time sequential output pulses, and a second AND gate coupled to said first means and said first AND gate responsive to said time sequential output pulses to sample said wave.

13. A decoder according to claim 9, wherein said fifth means includes a tuned circuit having time selected damping means.

14. A decoder according to claim 9, wherein said first portion of said combination includes at least one digit;

further including a timing generator producing a first timing signal at a fixed time prior to the arrival of said combination, a plurality of timing signals each time coincident with a different one of the digits of said second portion of said combination, at least one other timing signal time coincident with said one digit of said first portion of said combination, and a second timing signal succeeding said one other timing signal; and wherein said first means includes a damped tuned circuit coupled to said timing generator shock excited in response to said first timing signal;

said second means includes a first AND gate coupled to said source and said timing generator responsive to said plurality of timing signals and said given binary condition of the digits of said second portion of said combination to produce time sequential output pulses, and a second AND gate coupled to said damped tuned circuit and said first AND gate responsive to said time sequential output pulses to sample said wave;

said fourth means is coupled to said timing generator responsive to said one other timing signal to generate said pulse;

said fifth means includes a second tuned circuit having time selected damping means, said second tuned circuit being coupled to said second AND gate, said fourth means, and said timing generator, said second timing signal activating said damping means to damp said stored amplitude; and said sixth means is responsive to the binary condition of said one digit of said first portion of said combination to select said damped stored amplitude in the appropriate one of said adjacent time slots to produce said decoder output.

References Cited

UNITED STATES PATENTS

| | | | |
|---|---|---|---|
| 3,155,959 | 11/1964 | Bobbie et al. | 340—347 |
| 3,216,002 | 11/1965 | Hoffman | 340—347 |
| 3,257,657 | 6/1966 | French | 340—347 |
| 3,258,667 | 6/1966 | McDonough et al. | 340—347 |
| 3,263,185 | 7/1966 | Lender | 340—347 |
| 3,264,457 | 8/1966 | Seegmiller et al. | 340—347 |
| 3,293,635 | 12/1966 | Jankovich | 340—347 |
| 3,317,720 | 5/1967 | Lender | 340—347 |
| 3,308,454 | 3/1967 | Lehnhardt | 235—154 |
| 3,315,252 | 4/1967 | Melvin | 340—347 |

MAYNARD R. WILBUR, *Primary Examiner.*

W. J. KOPACZ, *Assistant Examiner.*